United States Patent
Meimberg et al.

(10) Patent No.: US 12,332,102 B2
(45) Date of Patent: Jun. 17, 2025

(54) AGEING AND DUST DETECTION IN A METER

(71) Applicant: Honeywell International Inc., Charlotte, NC (US)

(72) Inventors: Tobias Meimberg, Emden (DE); Norbert Flerlage, Loeningen (DE); Christian Lampe-Juergens, Spelle (DE); Andreas Wuchrer, Georgsmarienhuette (DE); Ralf Schroeder genannt Berghegger, Glandorf (DE)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 18/631,013

(22) Filed: Apr. 9, 2024

(65) Prior Publication Data
US 2024/0255336 A1     Aug. 1, 2024

Related U.S. Application Data

(62) Division of application No. 16/949,706, filed on Nov. 11, 2020, now abandoned.

(51) Int. Cl.
*G01F 15/00* (2006.01)
*B01D 45/08* (2006.01)
(Continued)

(52) U.S. Cl.
CPC ........ *G01F 15/125* (2013.01); *B01D 45/08* (2013.01); *G01F 1/662* (2013.01); *G01F 15/005* (2013.01)

(58) Field of Classification Search
None
See application file for complete search history.

(56) References Cited

U.S. PATENT DOCUMENTS

| | | | |
|---|---|---|---|
| 4,384,925 A | 5/1983 | Stetter et al. |
| 4,596,144 A | 6/1986 | Panton et al. |
| (Continued) | | |

FOREIGN PATENT DOCUMENTS

| | | | |
|---|---|---|---|
| CN | 104515560 A | 4/2015 |
| CN | 109358306 A | 2/2019 |
| (Continued) | | |

OTHER PUBLICATIONS

U.S. Appl. No. 16/949,697, filed Nov. 11, 2020, Norbert Flerlage.
(Continued)

*Primary Examiner* — Alexander A Mercado
(74) *Attorney, Agent, or Firm* — John Maldjian, Esq.; Stevens & Lee PC

(57) ABSTRACT

An ageing and dust detection system, comprising: a data collection unit configured to collect a plurality of parameters of a gas meter; and a processing unit, configured to: receive the plurality of the parameters of the gas meter; calculate a numerical value of the plurality of the parameters; compare the calculated numerical value of the plurality of the parameters with a corresponding predefined higher range of values and a predefined lower range of values for the plurality of parameters; determine a reason of a fault in the gas meter based on the compared values, wherein the reason of the fault in the gas meter is at least one of, a presence of a dust, an ageing of the gas meter, or a combination thereof.

16 Claims, 8 Drawing Sheets

(51) Int. Cl.
*G01F 1/66* (2022.01)
*G01F 15/12* (2006.01)

(56) References Cited

U.S. PATENT DOCUMENTS

| | | | |
|---|---|---|---|
| 5,649,986 | A | 7/1997 | Mueller |
| 5,969,263 | A | 10/1999 | Ligneul et al. |
| 6,766,276 | B1 | 7/2004 | Dury |
| 6,997,032 | B2 | 2/2006 | Mattar |
| 8,631,712 | B2 | 1/2014 | Zhu et al. |
| 8,955,392 | B2 | 2/2015 | Liu et al. |
| 9,671,269 | B2 | 6/2017 | Berger et al. |
| 9,797,765 | B2 | 10/2017 | Nagai et al. |
| 11,137,276 | B1 | 10/2021 | Helfenstein et al. |
| 11,323,785 | B1 * | 5/2022 | Lampe-Juergens ...... H04Q 9/00 |
| 11,754,429 | B2 | 9/2023 | Flerlage et al. |
| 11,920,971 | B2 | 3/2024 | Lampe-Jürgens et al. |
| 2007/0017304 | A1 | 1/2007 | Kumpfmueller |
| 2007/0192046 | A1 | 8/2007 | Hairston et al. |
| 2008/0087169 | A1 | 4/2008 | Clark |
| 2009/0187356 | A1 | 7/2009 | Artiuch et al. |
| 2012/0229295 | A1 | 9/2012 | Sharma et al. |
| 2013/0152527 | A1 | 6/2013 | Rother et al. |
| 2013/0152528 | A1 | 6/2013 | Disson et al. |
| 2015/0276433 | A1 | 10/2015 | Brahmajosyula et al. |
| 2016/0325218 | A1 | 11/2016 | Hasegawa et al. |
| 2017/0175741 | A1 | 6/2017 | Nishikawa et al. |
| 2017/0254688 | A1 | 9/2017 | Patten et al. |
| 2017/0298597 | A1 | 10/2017 | Hammond et al. |
| 2019/0145804 | A1 | 5/2019 | Artiuch |
| 2020/0149944 | A1 | 5/2020 | Haag et al. |
| 2020/0284613 | A1 * | 9/2020 | Shiota .................... G01D 4/004 |
| 2022/0049986 | A1 | 2/2022 | Lampe-Jürgens et al. |
| 2022/0146297 | A1 * | 5/2022 | Flerlage ................. B01D 45/16 |
| 2022/0146298 | A1 | 5/2022 | Meimberg et al. |
| 2022/0170774 | A1 * | 6/2022 | Lampe-Juergens .... G01D 4/004 |

FOREIGN PATENT DOCUMENTS

| | | |
|---|---|---|
| CN | 109598353 A | 4/2019 |
| CN | 110068789 A | 7/2019 |
| CN | 110927654 A | 3/2020 |
| DE | 19859854 A1 | 6/2000 |
| EP | 1064522 A1 | 1/2001 |
| JP | 2584935 B | 2/1997 |
| JP | 4024110 B | 12/2007 |
| JP | 5351742 B | 11/2013 |
| JP | 2014092467 A | 5/2014 |
| KR | 20180056003 A | 5/2018 |

OTHER PUBLICATIONS

U.S. Appl. No. 16/949,706, filed Nov. 11, 2020, Tobias Meimberg.
U.S. Appl. No. 17/247,129, filed Dec. 1, 2020, Christian Lampe-Juergens.
Extended European Search Report dated Jan. 10, 2022, issued in connection with corresponding EP Application No. 21189738.4 (10 pages total).

* cited by examiner

AGEING AND DUST DETECTION IN A METER

CROSS-REFERENCE TO RELATED APPLICATION

This application is a divisional of U.S. Ser. No. 16/949,706, filed Nov. 11, 2020 entitled "AGEING AND DUST DETECTION IN A METER" which is incorporated by reference in its entirety.

BACKGROUND

The present disclosure pertains to a system and a method for detecting a reason for a fault in meters such as a gas meter.

DESCRIPTION OF RELATED ART

Ultrasonic transducers used in a gas meter are very sensitive to dust contamination that negatively impacts a measurement accuracy of the gas meter. Moreover, an ageing of different components of the gas meter also causes a decrease in the measurement accuracy of the gas meter. In addition, a combination of these two factors results in a poor performance of the gas meter in long term, which needs to be rectified at a right time to mitigate additional costs of operating and changing a faulty gas meter.

Traditionally used systems can find out a fault in the gas meter and generate an alarm based on the detected fault. However, the traditional systems cannot predict a reason for the fault in the gas meter. In some cases, the fault can occur due to dust particles from gas pipelines, and in other cases, the fault can occur due to ageing of components of the gas meter. The dust particles are intended to be collected in a dust trap installed within the gas meter, which includes a capacity and a resistance measurement setup to detect if the dust particles are the reason for the fault. However, if the reason of the fault is ageing, then the capacity and resistance measurement setup of the dust trap is ineffective. Moreover, if the dust is not collected in the dust trap then the dust continue to flow to transducers and accumulate on the transducers that can affect a performance of the gas meter. In traditional systems, in case, an amplitude of a signal drops 10% from an initial amplitude, an alarm is activated, which notifies a gas meter operator about the detected fault in the gas meter. However, if a correct reason for the detected fault is unknown, then the meter operator may end up replacing the gas meter when the gas pipeline needs to be replaced, and vice versa.

There is thus a need for a system and a method for detecting a correct reason for a detected fault in a gas meter in a more efficient manner.

SUMMARY

The disclosure reveals an ageing and dust detection system, comprising: a data collection unit connected to a gas meter, configured to collect a plurality of parameters of the gas meter. Further, the ageing and dust detection system comprises a memory device storing executable instructions. Further, the ageing and dust detection system comprises a processing unit, in communication with the memory device, connected to the data collection unit, wherein the processing unit is configured to: receive each of the plurality of the parameters of the gas meter; calculate a numerical value of each of the plurality of the parameters; compare the calculated numerical value of each of the plurality of the parameters with a corresponding predefined higher range of values for each of the plurality of parameters, and a corresponding predefined lower range of values for each of the plurality of parameters; determine a reason of a fault in the gas meter based on the compared values of each of the plurality of the parameters, wherein the reason of the fault in the gas meter is at least one of, a presence of a dust, an ageing of the gas meter, or a combination thereof; and generate a report based on the determined reason of the fault.

The disclosure reveals an ageing and dust detection system, comprising: a data collection unit connected to a gas meter, configured to collect a plurality of parameters of the gas meter, wherein the plurality of parameters of the gas meter are at least one of, a temperature inside the gas meter, a time of the gas meter in a field, a volume of a flow, an amplitude of a signal, a gain amplification from an automatic-gain-control, a shape of the signal, a resonance frequency, a capacity of a filter mat of a multifunctional dust trap, a resistance of the filter mat of the multifunctional dust trap, or a combination thereof. Further, the ageing and dust detection system comprises a memory device storing executable instructions. Further, the ageing and dust detection system comprises a processing unit, in communication with the memory device, connected to the data collection unit, and the upper conductive grid and the lower conductive grid, wherein the processing unit is configured to: receive each of the plurality of the parameters of the gas meter; calculate a numerical value of each of the plurality of the parameters; compare the calculated numerical value of each of the plurality of the parameters with a corresponding predefined higher range of values for each of the plurality of parameters, and a corresponding predefined lower range of values for each of the plurality of parameters; determine a reason of a fault in the gas meter based on the compared values of each of the plurality of the parameters, wherein the reason of the fault in the gas meter is at least one of, a presence of a dust, an ageing of the gas meter, or a combination thereof; and generate a report based on the determined reason of the fault, wherein the report comprises the calculated numerical value of each of the plurality of parameters.

The disclosure reveals a method comprising steps of: receiving data associated with a plurality of parameters of a gas meter from a data collection unit connected to the gas meter, and a plurality of conductive grids of a multifunctional dust trap, wherein the plurality of parameters of the gas meter are selected from one of, a temperature inside the gas meter, a time of the gas meter in a field, an accumulated volume of a flow, an amplitude of a signal, a shape of the signal, a gain amplification from automatic-gain-control, a resonance frequency, a capacity of a filter mat of a multifunctional dust trap, a resistance of the filter mat of the multifunctional dust trap, or a combination thereof. Further, the method comprises a step of, calculating a numerical value of each of the plurality of parameters based on the received data; comparing the calculated numerical value of each of the plurality of the parameters with a corresponding predefined higher range of values for each of the plurality of parameters, and a corresponding predefined lower range of values for each of the plurality of parameters; determining a reason of a fault in the gas meter based on the compared values of each of the plurality of the parameters, wherein the reason of the fault in the gas meter is at least one of, a presence of a dust, an ageing of the gas meter, or a combination thereof; and generating a report based on the determined reason of the fault, wherein the report comprises the calculated numerical value of each of the plurality of the parameters.

The preceding is a simplified summary to provide an understanding of some embodiments of the present mechanism. This summary is neither an extensive nor exhaustive overview of the present mechanism and its various embodiments. The summary presents selected concepts of the embodiments of the present mechanism in a simplified form as an introduction to the more detailed description presented below. As will be appreciated, other embodiments of the present mechanism are possible utilizing, alone or in combination, one or more of the features set forth above or described in detail below.

DESCRIPTION

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

The present approach may provide a system and a method for detecting a reason for a fault in a gas meter. According to embodiments of the present mechanism, the reason may be a presence of a dust or an ageing of the gas meter.

The present approach may provide a system and a method for detecting a reason for a fault in a gas meter that may help to find out a root-cause of the gas meter failure in a field. In addition, the system and the method may provide a customer an additional information that pipes may be very rusty and should be exchanged.

The present mechanism has a feature in it that it may use the advantages of the prior used fault detection techniques without harvesting the disadvantage.

A technical benefit is to have a system and a method for detecting a reason for a fault in a gas meter for enabling a meter operator to take necessary actions to improve a measuring accuracy and lifetime of the gas meter.

A business advantage is to have a low-cost system for detecting a reason for a fault in a gas meter that provide additional features by without adding additional components to the gas meter.

Figure 1A:
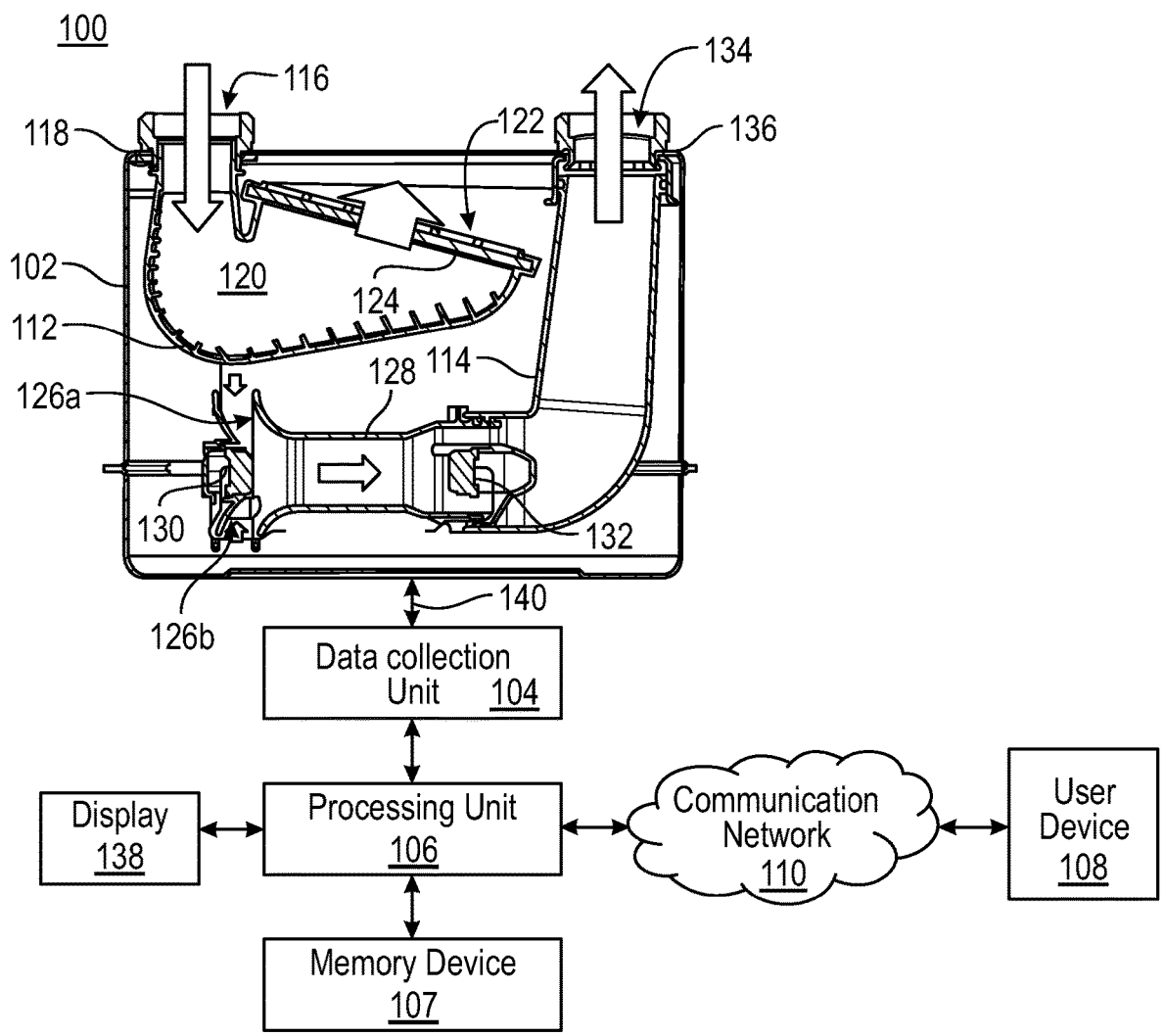
FIG. 1A is a diagram illustrating an ageing and dust detection system, according to an embodiment of the present mechanism.

FIG. 1A is a diagram illustrating an ageing and dust detection system 100. The ageing and dust detection system 100 may be configured to detect a reason for a fault in a measurement of a gas meter 102 when the gas meter 102 fails in a field.

The ageing and dust detection system 100 may comprise the gas meter 102, a data collection unit 104, a processing unit 106, and a user device 108. Further, the gas meter 102, the data collection unit 104, and the processing unit 106 may be configured to communicate with each other by one or more communication mediums. The communication medium may include, but not limited to, a coaxial cable, a copper wire, a fiber optic, a wire that comprise a system bus coupled to a processor of a computing device, and so forth. Embodiments of the present mechanism may include any of the communication medium known to a person skilled in the art that may be capable of enabling a communication within the ageing and dust detection system 100. Further, the processing unit 106, and the user device 108 may be connected through a communication network 110, according to embodiments of the present mechanism. The communication network 110 may include a data network such as, but not limited to, a Local Area Network (LAN), a Wide Area Network (WAN), a Metropolitan Area Network (MAN), Narrowband IoT (NB-IoT), and so forth. Embodiments of the present mechanism may include any of the communication network 110 known to a person skilled in the art that may be capable of enabling a communication within the ageing and dust detection system 100. According to an embodiment of the present mechanism, the processing unit 106, and the user device 108 may be configured to communicate with each other by one or more communication mediums connected to the communication network 110. As discussed above, the communication mediums include, but are not limited to, coaxial cables, copper wires, fiber optics, wires that comprise a system bus coupled to a processor of a computing device, and so forth. Embodiments of the present mechanism may include any of the communication mediums known to a person skilled in the art that may be capable of enabling a communication within the ageing and dust detection system 100.

Further, the gas meter 102 may be connected to a pipeline (not shown) to measure a flow rate of a gas passing through the gas meter 102. Further, the gas meter 102 may comprise a multifunctional dust trap 112, and a flow tube 114. According to embodiments of the present mechanism, the multifunctional dust trap 112 and the flow tube 114 may be made up of a material, such as, but not limited to, a natural plastic, a Polybutylene Terephthalate (PBT) material, a Thermoplastic elastomers (TPE), and so forth. Embodiments of the present mechanism may include any of the material for making the multifunctional dust trap 112 and the flow tube 114 known to a person skilled in the art that may be capable of providing a durability to the multifunctional dust trap 112 and the flow tube 114.

The multifunctional dust trap 112 may comprises an inlet 116 that may be connected to a gas inlet 118 of the gas meter 102. A flow of the gas may enter from the inlet 116 into a chamber 120 of the multifunctional dust trap 112. According to an embodiment of the present mechanism, a larger cross-sectional area of the chamber 120 in comparison with the inlet 116 may cause a drop in a velocity of the flow of the gas. Further, the chamber 120 may guide the flow of the gas towards an outlet 122 of the multifunctional dust trap 112. The outlet 122 may comprise a filter mat 124 fixedly attached to the outlet 122 for filtering a plurality of micro-dust particles (hereinafter referred to as the micro-dust particles). The filter mat 124 may filter the gas thus eliminating the micro-dust particles from the gas to produce a clean gas. Further, the clean gas may enter the flow tube 114 installed within the gas meter 102. The flow tube 114 may comprise a plurality of flow inlets 126*a*-126*b* (hereinafter referred to as the flow inlets 126) for enabling a balanced flow of the gas into a flow chamber 128 of the flow tube 114. The flow tube 114 may further comprise a first transducer 130 connected near a first end of the flow chamber 128 and a second transducer 132 connected near a second end of the flow chamber 128. The first transducer 130 and the second transducer 132 may be a device capable of converting an electrical energy into a plurality of acoustic waves (hereinafter referred to as the acoustic waves). Further, the first transducer 130 and the second transducer 132 may be connected in the flow tube 114 such that the first transducer 130 and the second transducer 132 faces each other. The first transducer 130 may be configured to transmit the generated acoustic waves towards the second transducer 132 and the second transducer 132 may be configured to transmit the generated acoustic waves towards the first transducer 130. Further, an outlet 134 of the flow tube 114 may be connected to a gas outlet 136 of the gas meter 102. The gas outlet 136 may be connected to the pipeline (not shown) that may receive the flow of the clean gas from the flow tube 114, according to an embodiment of the present mechanism.

Further, the gas meter 102 may comprise a display 138 connected to the processing unit 106 that may be configured to display an output generated by the processing unit 106, according to an embodiment of the present mechanism. The display 138 may be, but not limited to, a digital display, a touch screen display, and so forth. Embodiments of the present mechanism may include any of the display 138 known to a person skilled in the art that may be capable of displaying the output generated by the processing unit 106.

The data collection unit 104 of the ageing and dust detection system 100 may be an electrical device connected to the gas meter 102 through a connecting wire 140, according to an embodiment of the present mechanism. In another embodiment of the present mechanism, the data collection unit 104 may be connected to the gas meter 102 through a wireless connection. The data collection unit 104 may comprise a plurality of electrical circuits that may be configured to collect data of a plurality of parameters (hereinafter referred to as the parameters) associated with the gas meter 102, in an embodiment of the present mechanism. The parameters may be, but not limited to, a temperature inside the gas meter 102, a time of the gas meter 102 in a field, an accumulated volume of a flow, an amplitude of a signal, a shape of the signal, a gain amplification from an automatic-gain-control, a resonance frequency, a capacity of a filter mat 124, a resistance of a filter mat 124 (as shown in the FIG. 1B), and so forth. Embodiments of the present mechanism may include any of the parameters associated with the gas meter 102 known to a person skilled in the art. In an embodiment of the present invention, the temperature inside the gas meter 102 may be sensed using a temperature sensor (not shown) that may be configured to transmit the sensed temperature inside the gas meter 102 to the data collection unit 104. Further, the data collection unit 104 may be configured to determine the time of the gas meter 102 in the field in real time using an integrated clock (not shown) installed within the gas meter 102, in an embodiment of the present mechanism. In another embodiment of the present mechanism, the time of the gas meter 102 in the field may be manually entered by a user by using the display 138 that may transmit the data to the processing unit 106. The user may be, but not limited to, a meter operator, a serviceman, and so forth. Embodiments of the present invention are intended to include or otherwise cover any user of the ageing and dust detection system 100.

Furthermore, the data collection unit 104 may be configured to collect the temperature inside the gas meter 102, the time of the gas meter 102 in the field, the accumulated volume of the flow, the amplitude of the signal, the shape of the signal, the gain amplification from the automatic-gain-control, the resonance frequency, the capacity of the filter mat 124, and the resistance of the filter mat 124 through an electrical circuit (not shown) of the gas meter 102, in an embodiment of the present mechanism. Further, the data collection unit 104 may be configured to transmit the collected data to the processing unit 106. The processing unit 106 may be configured to receive and/or transmit data within the ageing and dust detection system 100 using the communication network 110. Further, the processing unit 106 may be configured to process data associated with the ageing and dust detection system 100 to generate the output, in an embodiment of the present mechanism. According to embodiments of the present invention, the processing unit 106 may be, but not limited to, a Programmable Logic Control unit (PLC), a microcontroller, a microprocessor, a computing device, a development board, and so forth. Embodiments of the present invention are intended to include or otherwise cover any type of the processing unit 106 known to a person skilled in the art that may be capable of processing the received data. Further, components of the processing unit 106 will be explained in detail in conjunction with FIG. 3.

The processing unit 106 may be further connected to a memory device 107 that may be configured to store a plurality of computer executable instructions. The memory device 107 may be, but not limited to, a Random Access Memory (RAM), a Read Only Memory (ROM), a flash memory, and so forth. Embodiments of the present invention are intended to include or otherwise cover any type of the memory device 107 known to a person skilled in the art.

The user device 108 may be configured to enable the user to receive data and to transmit data within the ageing and dust detection system 100. The user may be, but not limited to, a meter operator, a serviceman, and so forth. Embodiments of the present invention are intended to include or otherwise cover any user of the ageing and dust detection system 100. According to embodiments of the present invention, the user device 108 may be, but not limited to, a mobile device, a smart phone, a tablet computer, a portable computer, a laptop computer, a desktop computer, a smart device, a smart watch, a smart glass, and so forth. Embodiments of the present invention are intended to include or otherwise cover any type of the user device 108 known to a person skilled in the art.

Figure 1B:
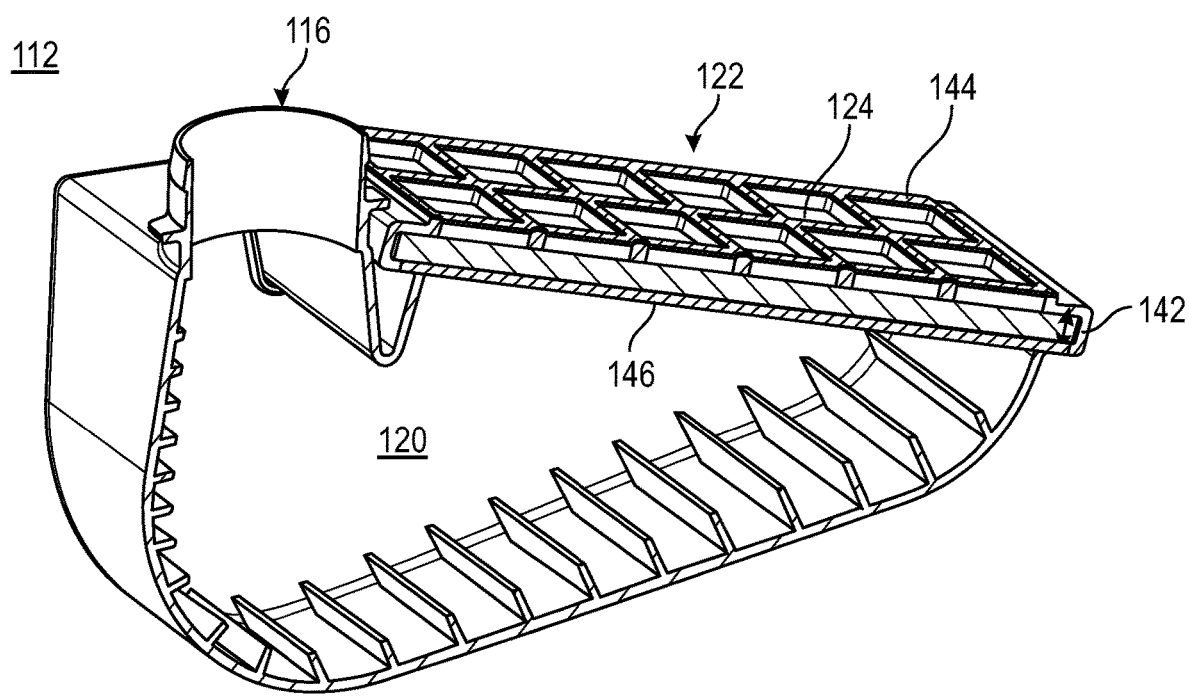
FIG. 1B is a diagram illustrating a cross-sectional front view of a multifunctional dust trap for measuring one of a plurality of parameters of a gas meter, according to an embodiment of the present mechanism.

FIG. 1B is a diagram illustrating a cross-sectional front view of the multifunctional dust trap 112 for measuring the parameters of the gas meter 102. The parameters may be the capacity of the filter mat 124 and the resistance of the filter mat 124, according to an embodiment of the present mechanism. The inlet 116 of the multifunctional dust trap 112 may be attached to the chamber 120. The outlet 122 may be provided to enable the exit of the clean gas from the chamber 120 of the multifunctional dust trap 112. Further, the outlet 122 may comprise a frame 142 that may be capable of fixedly holding the filter mat 124, in an embodiment of the present mechanism. Further, the frame 142 may comprise an upper conductive grid 144, and a lower conductive grid 146 such that the upper conductive grid 144 and the lower conductive grid 146 sandwiches the filter mat 124. The upper conductive grid 144 and the lower conductive grid 146 may be further connected to a power source (not shown) that may be capable of enabling the upper conductive grid 144 and the lower conductive grid 146 to generate an electrostatic charge. The generated electrostatic charge may be used to generate data representing an amount of the micro-dust particles collected by the filter mat 124. The upper conductive grid 144 and the lower conductive grid 146 sandwiching the filter mat 124 may form a capacitance that may enable a capacitive measurement of the amount of the micro-dust particles collected by the filter mat 124. The micro-dust particles may be, but not limited to, Iron (II, III) Oxide ($Fe_3O_4$), Ferrous Oxide (FeO), Silicone Oxide (SiO), and so forth. Embodiments of the present invention are intended to include or otherwise cover any type of the micro-dust particles known to a person skilled in the art. Further, the upper conductive grid 144, and the lower conductive grid 146 may be configured to transmit the data representing the amount of the micro-dust particles collected by the filter mat 124 to the processing unit 106.

Figure 2A:
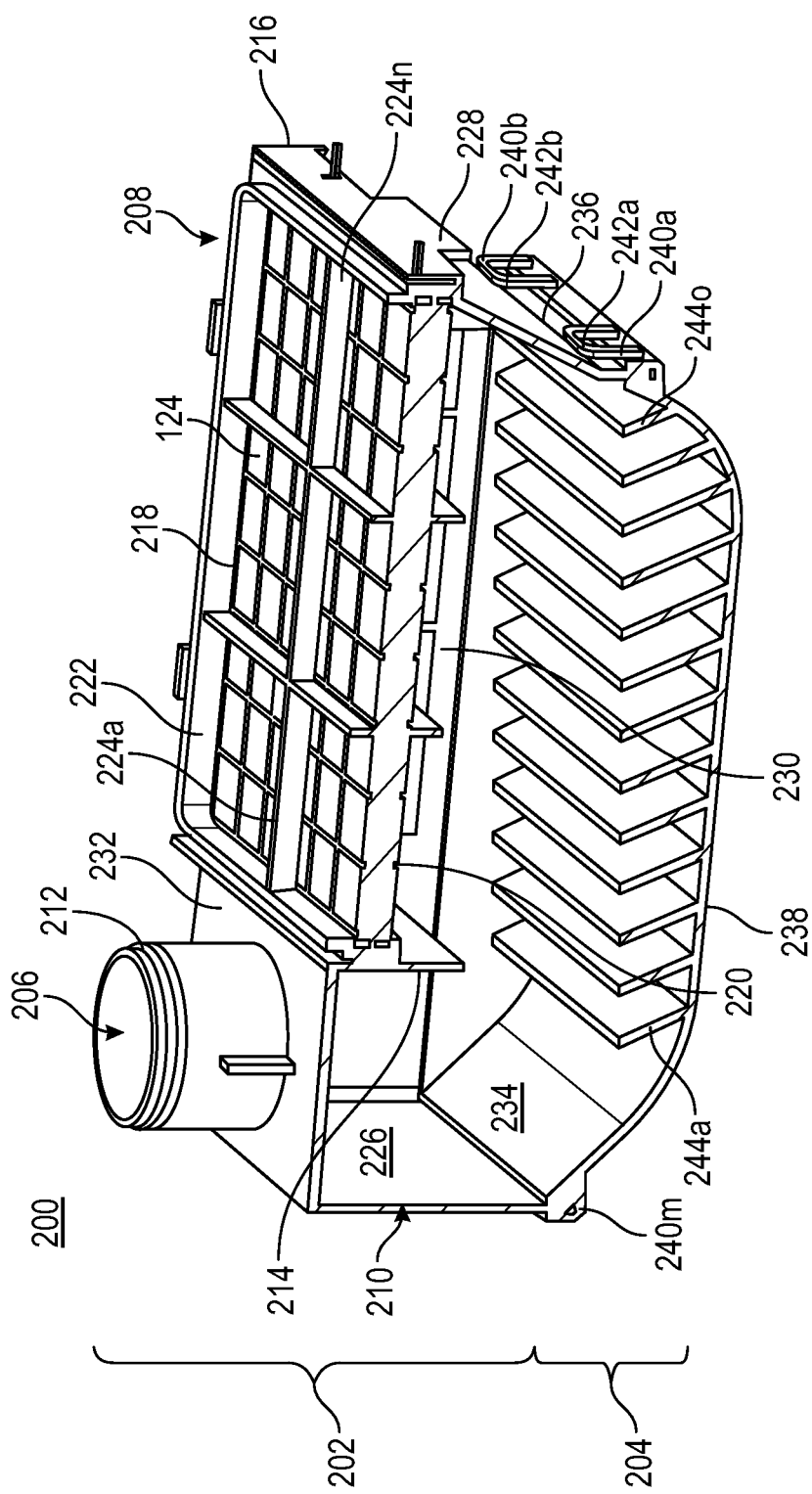
FIG. 2A is a diagram illustrating a cross-sectional front view of a multifunctional dust trap for measuring one of the plurality of parameters of the gas meter, according to another embodiment of the present mechanism.

FIG. 2A is a diagram illustrating a cross-sectional front view of a multifunctional dust trap 200 for measuring the parameters of the gas meter 102. The parameters may be the capacity and the resistance of the filter mat 124, according to another embodiment of the present mechanism. The multifunctional dust trap 200 comprises a top part 202, and a bottom part 204. Further, the top part 202, and the bottom part 204 may be made up of a material such as, but not limited to, a natural plastic, a synthetic plastic, a natural rubber, a synthetic rubber, a metal, and so forth. The top part 202, and the bottom part 204 may be made up of any of the material known to a person skilled in the art that may provide a durability to the multifunctional dust trap 200.

The top part 202 may comprise an inlet 206, an outlet 208, and an upper chamber 210. The inlet 206 may be a cylindrical shaped hollow structure for connecting the multifunctional dust trap 200 with the gas meter 102. The inlet 206 may comprise an inlet cavity 212 on an outer surface along a circumference of the inlet 206 to fixedly connect the multifunctional dust trap 200 with the gas meter 102, in an embodiment of the present mechanism. In another embodiment of the present mechanism, the inlet cavity 212 may be provided to removably connect the multifunctional dust trap 200 with the gas meter 102 by using a plurality of threads (not shown).

Figure 2B:
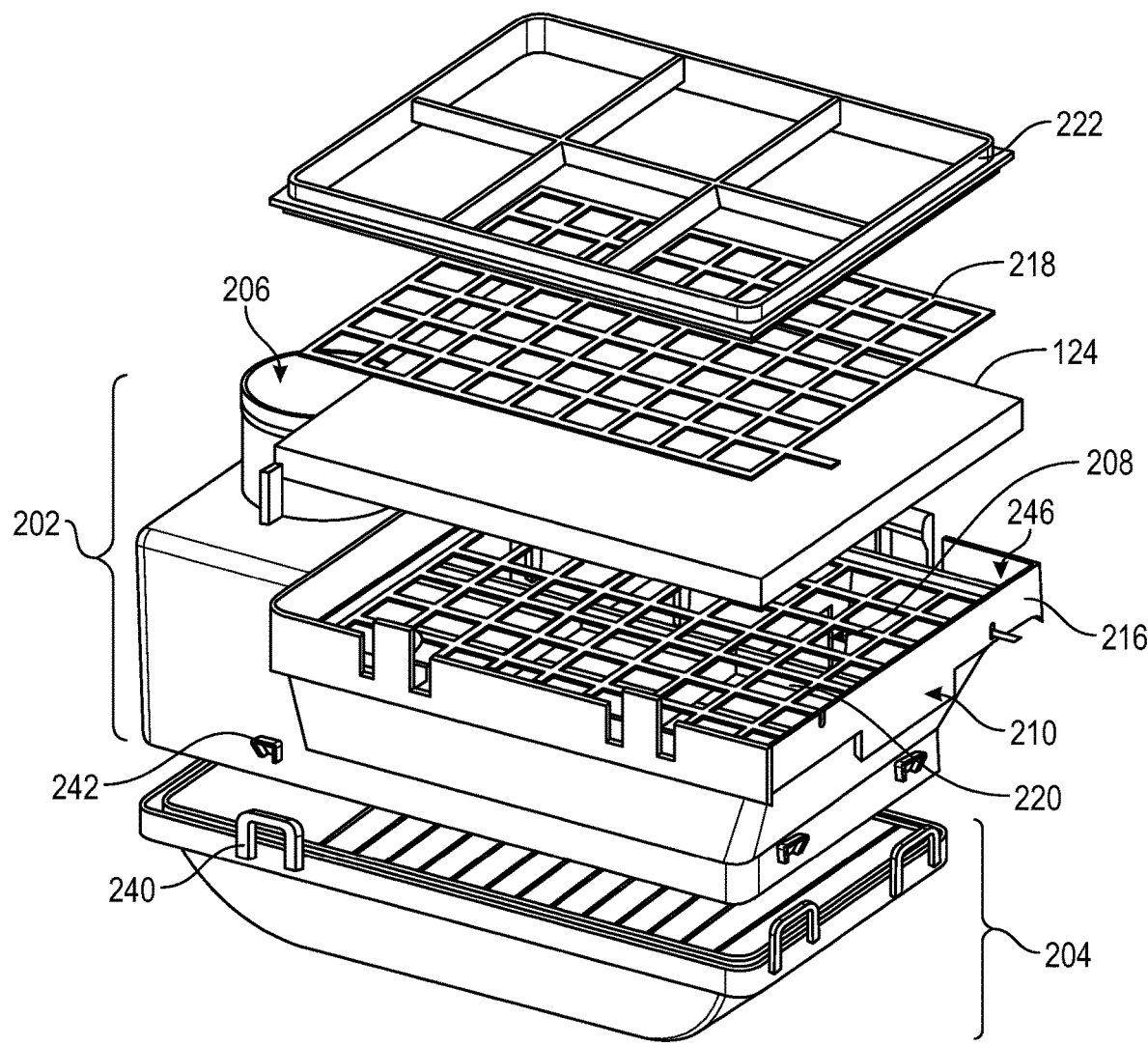
FIG. 2B is a diagram illustrating an exploded view of the multifunctional dust trap, according to an embodiment of the present mechanism.

The outlet 208 may be an opening adjacent to the inlet 206, which may be provided to enable an exit of a flow of a clean gas from the upper chamber 210. The flow of the clean gas may be free from the dust particles that may improve an accuracy of a measurement of the gas meter 102. The outlet 208 and the inlet 206 may be connected through a vertical wall 214. The vertical wall 214 may act as a channel for guiding the flow of the gas through the upper chamber 210 from the inlet 206 towards the outlet 208. Further, the vertical wall 214 and the upper chamber 210 may form a frame 216 having a cavity 246 (as shown in FIG. 2B) provided on an inner surface along a perimeter of the frame 216. A shape of the frame 216 may be, but not limited to, a square, a rectangular, and so forth. Embodiments of the present mechanism may include any of the shape of the frame 216 known to a person skilled in the art. Further, the frame 216 may be capable of fixedly holding the filter mat 124, in an embodiment of the present mechanism. The filter mat 124 may be fixedly attached within the frame 216 for filtering a plurality of micro-dust particles (hereinafter referred to as the micro-dust particles) from the gas, in an embodiment of the present mechanism. In another embodiment of the present mechanism, the filter mat 124 may be removably attached within the frame 216 by using a snap lock mechanism. Further, the filter mat 124 may be made up of a material such as, but not limited to, a fabric, a woven material, and so forth. Embodiments of the present mechanism may include any of the material for making the filter mat 124 known to a person skilled in the art that may be capable of filtering the micro-dust particles.

Further, the frame 216 may comprise an upper conductive grid 218, and a lower conductive grid 220 such that the upper conductive grid 218 and the lower conductive grid 220 sandwiches the filter mat 124. The upper conductive grid 218 and the lower conductive grid 220 may be further connected to a power source (not shown) that may be capable of enabling the upper conductive grid 218 and the lower conductive grid 220 to generate an electrostatic charge. The generated electrostatic charge may be used to generate data representing an amount of the micro-dust particles collected by the filter mat 124. The upper conductive grid 218 and the lower conductive grid 220 sandwiching the filter mat 124 may form a capacitance that may enable a capacitive measurement of the amount of the micro-dust particles collected by the filter mat 124. In another embodiment of the present invention, the upper conductive grid 218 and the lower conductive grid 220 sandwiching the filter mat 124 may be capable of generating data representing a resistance of the filter mat 124 that may be used for a resistive measurement of the resistance of the filter mat 124. Further, the upper conductive grid 218, and the lower conductive grid 220 may be configured to transmit the data representing the amount of the micro-dust particles collected by the filter mat 124 and the data representing the resistance of the filter mat 124 to the processing unit 106 through the data collection unit 104. The frame 216 may further comprise a cover 222 that may be fixedly attached onto the upper conductive grid 218 to hold the upper conductive grid 218 in place, in an embodiment of the present mechanism. In another embodiment of the present mechanism, the cover 222 may be removably attached onto the upper conductive grid 218 using a snap lock mechanism. Further, the cover 222 may comprise a plurality of ribs 224a-224n (hereinafter referred to as the ribs 224) connected to each other forming a grid like structure to cover the upper conductive grid 218. The cover 222 may be made up of a material such as, but not limited to, a natural plastic, a Polybutylene Terephthalate (PBT) material, a Thermoplastic elastomers (TPE), and so forth. Embodiments of the present mechanism may include any of the material for making the cover 222 known to a person skilled in the art that may be capable of providing a durability to the cover 222.

The upper chamber 210 may comprise a first wall 226, a second wall 228, a side wall 230, and a top surface 232. The first wall 226, the second wall 228, the side walls 230, and the top surface 232 may form a hollow enclosure defining the upper chamber 210. The inlet 206 may be connected to the top surface 232 of the upper chamber 210, in an embodiment of the present mechanism. The first wall 226 may be a flat wall extending vertically in a downward direction from the top surface 232. The second wall 228 may be a curved wall extending vertically in a downward direction from the frame 216.

The bottom part 204 may comprise a first curved wall 234, a second curved wall 236, and a base 238. The first curved wall 234 and the second curved wall 236 may be a concave shaped wall designed to guide the flow of the gas from the inlet 206 to the outlet 208. Further, the bottom part 204 may comprise a plurality of locking mechanism 240a-240m (hereinafter referred to as the locking mechanism 240) that may be capable of fixedly engaging with a plurality of protrusions 242a-242m (hereinafter referred to as the protrusions 242) provided on the side wall 230 of the upper chamber 210 to attach the bottom part 204 with the top part 202. Further, the locking mechanism 240 may be a snap lock mechanism, in an embodiment of the present mechanism. Further, the base 238 may comprise a plurality of ribs 244a-244o (hereinafter referred to as the ribs 244) extending vertically in an upward direction from an inner surface of the base 238. The ribs 244 may be fixedly attached along a length of the base 238, in an embodiment of the present mechanism.

FIG. 2B is a diagram illustrating an exploded view of the multifunctional dust trap 200, according to an embodiment of the present mechanism. The multifunctional dust trap 200 comprises the top part 202, and the bottom part 204. The top part 202 may comprise the inlet 206, the outlet 208, and the upper chamber 210. The frame 216 having the cavity 246 may be provided to fixedly hold the filter mat 124, in an embodiment of the present mechanism. Further, the frame 216 may comprise the upper conductive grid 218, and the lower conductive grid 220 sandwiching the filter mat 124. The upper conductive grid 218 and the lower conductive grid 220 may be further connected to the power source that may be capable of enabling the upper conductive grid 218 and the lower conductive grid 220 to generate an electrostatic charge. The generated electrostatic charge may be used to generate data representing an amount of the micro-dust particles collected by the filter mat 124. The upper conductive grid 218 and the lower conductive grid 220 sandwiching the filter mat 124 may form the capacitance that may enable a capacitive measurement of the amount of the micro-dust particles collected by the filter mat 124. The frame 216 may further comprise the cover 222 that may be fixedly attached onto the upper conductive grid 218 to hold the upper conductive grid 218 in place, in an embodiment of the present mechanism. The bottom part 204 may comprise the locking mechanism 240 that may be capable of fixedly engaging with the protrusions 242 provided on the upper chamber 210 to attach the bottom part 204 with the top part 202.

Figure 3:
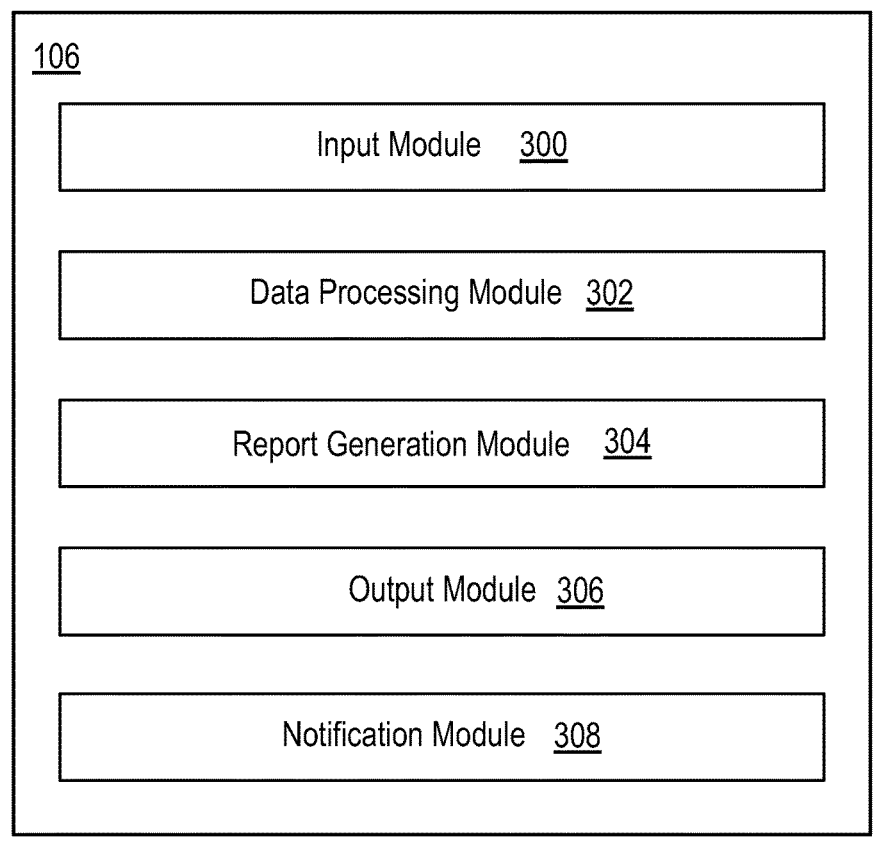
FIG. 3 is a diagram illustrating components of a processing unit, according to an embodiment of the present mechanism.

FIG. 3 is a diagram illustrating components of the processing unit 106, according to an embodiment of the present mechanism. The processing unit 106 comprises an input module 300, a data processing module 302, a report generation module 304, an output module 306, and a notification module 308.

The input module 300 may be configured to receive the data associated with the parameters of the gas meter 102. The input module 300 may be configured to collect the data of the parameters of the gas meter 102 from the data collection unit 104, according to an embodiment of the present mechanism. The parameters may be, but not limited to, a temperature inside the gas meter 102, a time of the gas meter 102 in a field, an accumulated volume of a flow, an amplitude of a signal, a shape of the signal, a gain amplification from automatic-gain-control, a resonance frequency, and so forth. The input module 300 may further be configured to collect the data of the parameters of the gas meter 102 from the upper conductive grid 144 and the lower conductive grid 146 to measure the parameter, i.e., the capacity of the filter mat 124 and the resistance of the filter mat 124, according to an embodiment of the present mechanism. Further, the input module 300 may be configured to transmit the received data to the data processing module 302.

Figure 4A:
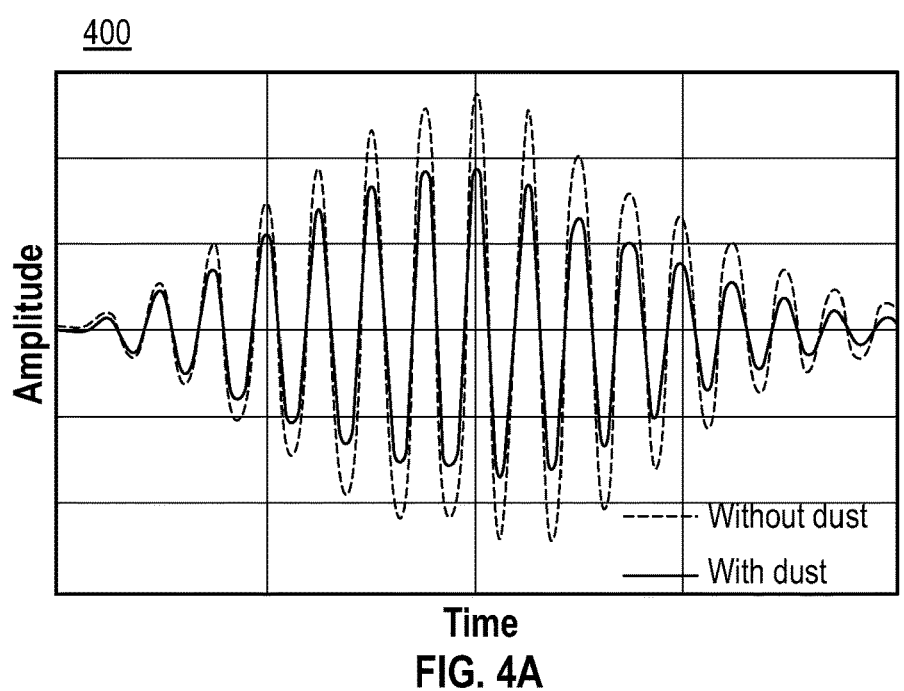
FIG. 4A is a diagram illustrating an amplitude time graph for a wave package transmitted by a first transducer and captured by a second transducer of a flow tube of the ageing and dust detection system, according to an embodiment of the present mechanism.

The data processing module 302 may be configured to process the data received from the input module 300. The data processing module 302 may be configured to calculate a numerical value of each of the parameters of the gas meter 102. Further, the data processing module 302 may be configured to compare the calculated numerical value of each of the parameters with a predefined upper range of values corresponding to each of the parameters and a predefined lower range of values associated with each of the parameters. In an embodiment of the present mechanism, the predefined upper range of values and the predefined lower range of values may be stored in the memory device 107. The data processing module 302 may further be configured to determine a reason for a fault in the measurement of the gas meter 102 based on the compared numerical values. In an embodiment of the present mechanism, the data processing module 302 may be configured to process the received data associated with the parameters of the gas meter 102 to generate an amplitude time graph 400 (as shown in FIG. 4A) for a wave package transmitted by the first transducer 130 and captured by the second transducer 132. In another embodiment of the present mechanism, the data processing module 302 may process the received data associated with the parameters of the gas meter 102 to generate an amplitude time graph (not shown) for a signal transmitted by the second transducer 132 and captured by the first transducer 130.

Further, the data processing module 302 may be configured to determine a numerical value of the amplification from the automatic gain control required to adjust an amplitude of the wave package to a desired value, in an embodiment of the present mechanism. In an embodiment of the present mechanism, if the determined numerical value of the amplification from the automatic gain control is high that represents that the received amplitude of the signal is decreased, then the data processing module 302 may be configured to determine that the reason for the fault in the gas meter 102 is the dust in the gas meter 102 and/or the ageing of the gas meter.

The data processing module 302 may receive the time of the gas meter 102 in the field, in an embodiment of the present mechanism. Further, the data processing module 302 may be configured to compare the received time with the predefined upper range of values of the time in the field and the predefined lower range of values of the time in the field.

In case, the received time is within the upper range of values of the time in the field, then the data processing module 302 may be configured to determine that the reason for the decreased amplitude of the signal and the reason for the fault in the measurement of the gas meter 102 is due to ageing of the gas meter 102. In case, the received time is within the lower range of values of the time in the field, then the data processing module 302 may be configured to determine that the decreased amplitude of the signal and the reason for the fault in the measurement of the gas meter 102 is due to the presence of dust in the gas meter 102.

Further, the data processing module 302 may be configured to calculate the numerical value of the accumulated volume of the flow through the flow tube 114 by calculating a time of flight upstream (TOF UPS) of the acoustic waves from a wave package upstream received by the second transducer 132 from the first transducer 130 and a time of flight downstream (TOF DNS) of the acoustic waves from a wave package downstream received by the first transducer 130 from the second transducer 132. Further, the data processing module 302 may be configured to determine a time difference (dTOF) between both TOF UPS and TOF DNS. The data processing module 302 may be configured to calculate a flowrate using the dTOF, TOF UPS, and TOF DNS, in an embodiment of the present mechanism. Further, the data processing module 302 may be configured to calculate the numerical value of the accumulated volume of the flow through the flow tube 114 using the calculated flow rate and a time of propagation. Furthermore, the data processing module 302 may be configured to compare the calculated numerical value of the accumulated volume of the flow with the predefined upper range of values of the accumulated volume of the flow and the predefined lower range of values of the accumulated volume of the flow. In case, the calculated numerical value of the accumulated volume of the flow is within the upper range of values of the accumulated volume of the flow that may be equal to 1 Million Cubic Feet on a counter (not shown) of the gas meter 102, then the data processing module 302 may be configured to determine that the reason for the fault in the measurement of the gas meter is due to the presence of dust and/or the ageing of the gas meter 102. In case, the calculated numerical value of the accumulated volume of the flow is within the lower range of values of the accumulated volume of the flow, then the data processing module 302 may be configured to determine that the reason for the fault in the measurement of the gas meter 102 is due to the presence of dust and/or a defect in the first transducer 130 and/or a defect in the second transducer 132.

Further, the data processing module 302 may be configured to compare the calculated temperature within the gas meter 102 received from the data collection unit 104 with the predefined upper range of values of the temperature and the predefined lower range of values of the temperature. In case, the calculated temperature is within the upper range of values of the temperature, then the data processing module 302 may be configured to determine that the reason for the fault in the measurement of the gas meter 102 is due to the ageing of the gas meter 102. In case, the calculated temperature is within the lower range of values of the temperature, then the data processing module 302 may be configured to determine that the reason for the fault in the measurement of the gas meter 102 is due to the presence of dust.

Furthermore, the data processing module 302 may be configured to calculate the capacity of the filter mat 124 and the resistance of the filter mat 124 based on the received data from the upper conductive grid 144 and the lower conductive grid 146. Further, the data processing module 302 may be configured to compare the calculated capacity of the filter mat 124 and resistance of the filter mat 124 with the predefined upper range of values of the capacity and the predefined upper range of values of the resistance and the predefined lower range of values of the capacity and the predefined lower range of values of the resistance. In case, the calculated capacity of the filter mat 124 and the resistance of the filter mat 124 is within the upper range of values of the capacity and the resistance, then the data processing module 302 may be configured to determine that the reason for the fault in the measurement of the gas meter 102 is due to the presence of the dust. In case, the calculated capacity of the filter mat 124 and the resistance of the filter mat 124 is within the lower range of values of the capacity and the resistance, then the data processing module 302 may be configured to determine that the reason for the fault in the measurement of the gas meter 102 is due to the ageing of the gas meter 102.

Figure 4B:
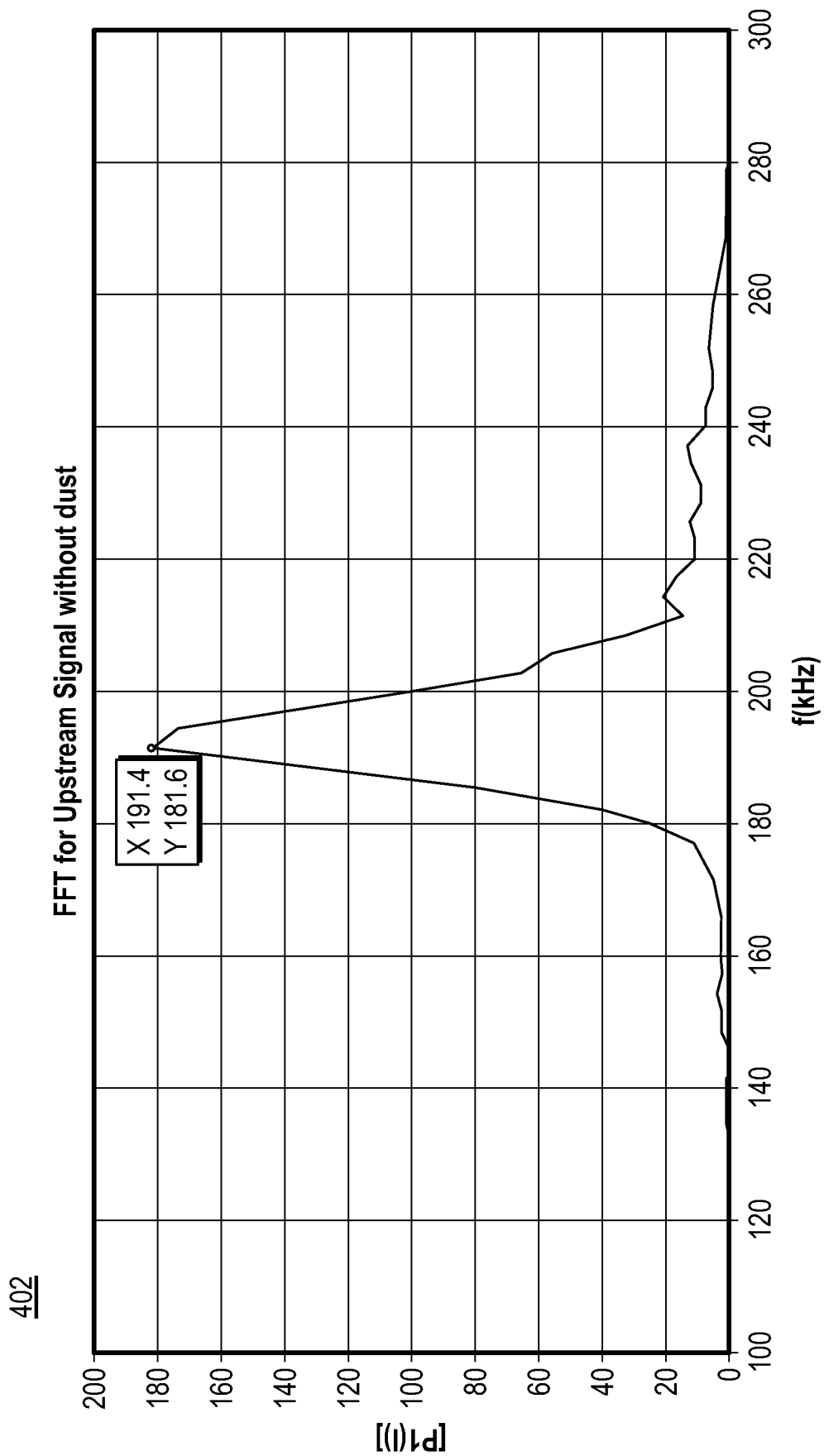
FIG. 4B is a diagram illustrating a graph of a Fast Fourier Transform (FFT) for the wave package upstream received at the second transducer without a presence of a dust, according to an embodiment of the present mechanism.
Figure 4C:
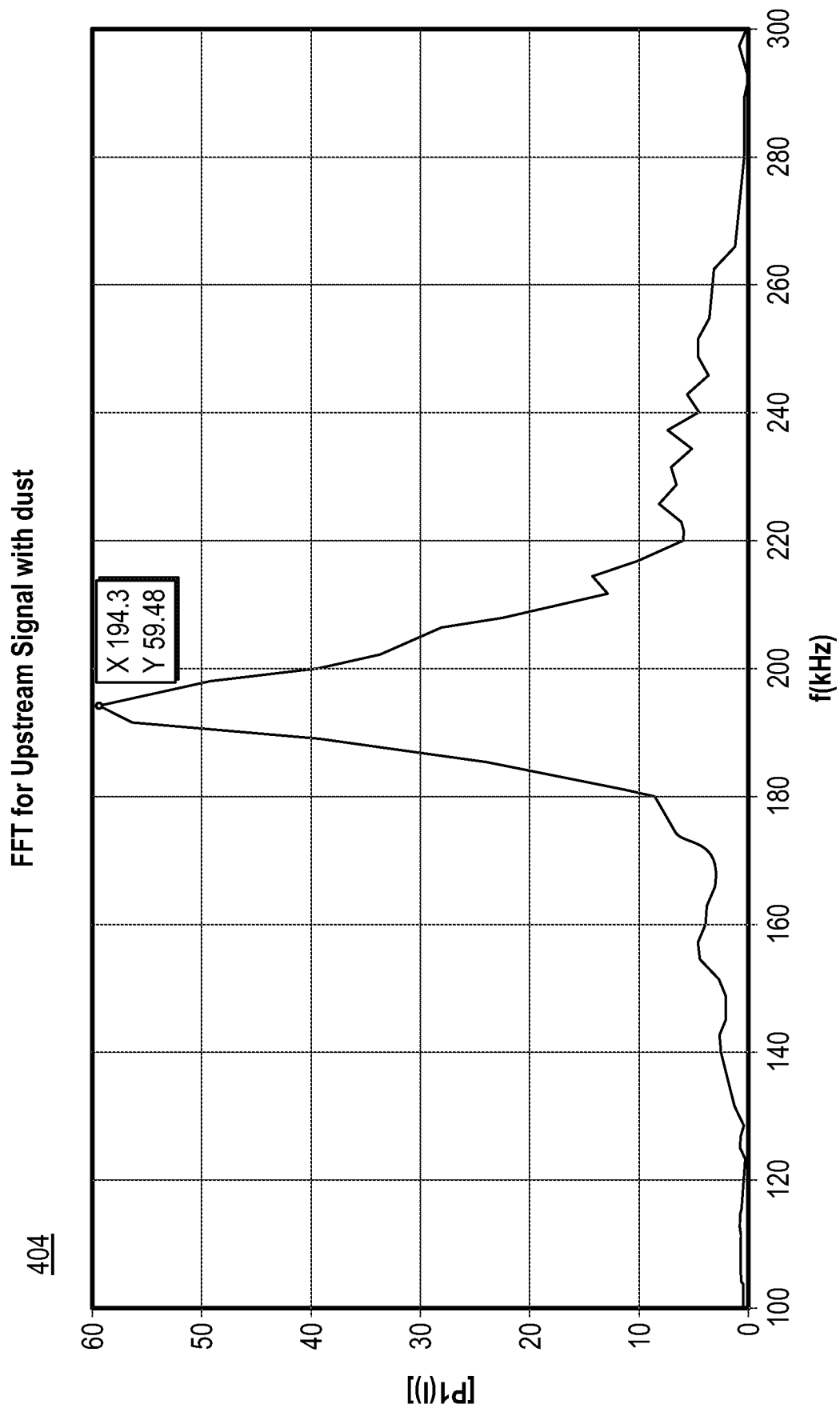
FIG. 4C is a diagram illustrating the graph of the FFT for the wave package upstream received at the second transducer with the presence of the dust, according to an embodiment of the present mechanism.

In another embodiment of the present mechanism, the data processing module 302 may be configured to calculate the resonance frequency based on the received data representing the wave package received at the second transducer 132 from the first transducer 130 by using a Fast Fourier Transform (FFT). In an embodiment of the present mechanism, the data processing module 302 may be configured to generate a graph of a FFT for the wave package upstream received at the second transducer 132 from the first transducer 130 to calculate the resonance frequency and an amplitude drop. According to an embodiment of the present mechanism, a sampling frequency of the FFT may be increased to achieve more accurate results. In an exemplary scenario, the data processing module 302 may be configured to generate a graph 404 (as shown in FIG. 4C) of a FFT for the wave package upstream received at the second transducer 132 with the presence of the dust to calculate the resonance frequency. Further, the data processing module 302 may be configured to compare the calculated resonance frequency with a standard resonance frequency determined from a graph 402 (as shown in FIG. 4B) of a FFT for the wave package upstream received at the second transducer 132 without the presence of the dust. In case, the data processing module 302 determines a shift in the calculated resonance frequency from the standard resonance frequency, then the data processing module 302 may be configured to determine that the reason for the fault in the measurement of the gas meter 102 is due to the presence of dust. Further, the data processing module 302 may be configured to calculate a slope from a minimum wave to a maximum wave of the signal to calculate the shape of the signal. Furthermore, the calculated shape of the signal may be compared with a standard signal shape, in an embodiment of the present mechanism.

The report generation module 304 may be configured to generate a report based on the processed data from the data processing module 302. The generated report may comprise the determined reason of the fault in the measurement of the gas meter 102. Further, the report may comprise the calculated numerical values of each of the parameters. In an embodiment of the present mechanism, the report generation module 304 may be further configured to generate a notification comprising the generated report and an alert signal. Further, the report generation module 304 may be configured to transmit the generated notification to the output module 306 and the notification module 308.

The output module 306 may be configured to display the generated report through the display 138, in an embodiment of the present mechanism. In another embodiment of the present mechanism, the alert signal may enable the output module 306 to generate an alarm using a buzzer (not shown) installed in the gas meter 102.

Further, the notification module 308 may be configured to transmit the generated notification to the user device 108 of the user. In another embodiment of the present invention, the notification module 308 may be configured to transmit the notification to a head-end system. The alert signal of the notification may be capable of generating an alarm at the head-end system to alert the administrator about the detected reason for the fault in the measurement of the gas meter 102.

FIG. 4A is a diagram illustrating the amplitude time graph 400 for the wave package transmitted by the first transducer 130 and captured by the second transducer 132 of the flow tube 114. The graph 400 depicts an amplitude of the acoustic waves of the wave package when the first transducer 130 has a layer of accumulated dust particles and an amplitude of the acoustic waves of the wave package when the first transducer 130 is dust free.

FIG. 4B is a diagram illustrating the graph 402 of the FFT for the wave package upstream received at the second transducer 132 (as shown in the FIG. 1A) without the presence of the dust.

FIG. 4C is a diagram illustrating the graph 404 of the FFT for the wave package upstream received at the second transducer 132 (as shown in the FIG. 1A) with the presence of the dust. The amplitude of the acoustic waves of the wave package received at the second transducer 132 may be decreased as compared to the amplitude of the acoustic waves of the wave package received at the second transducer 132 without the presence of the dust.

Figure 5:
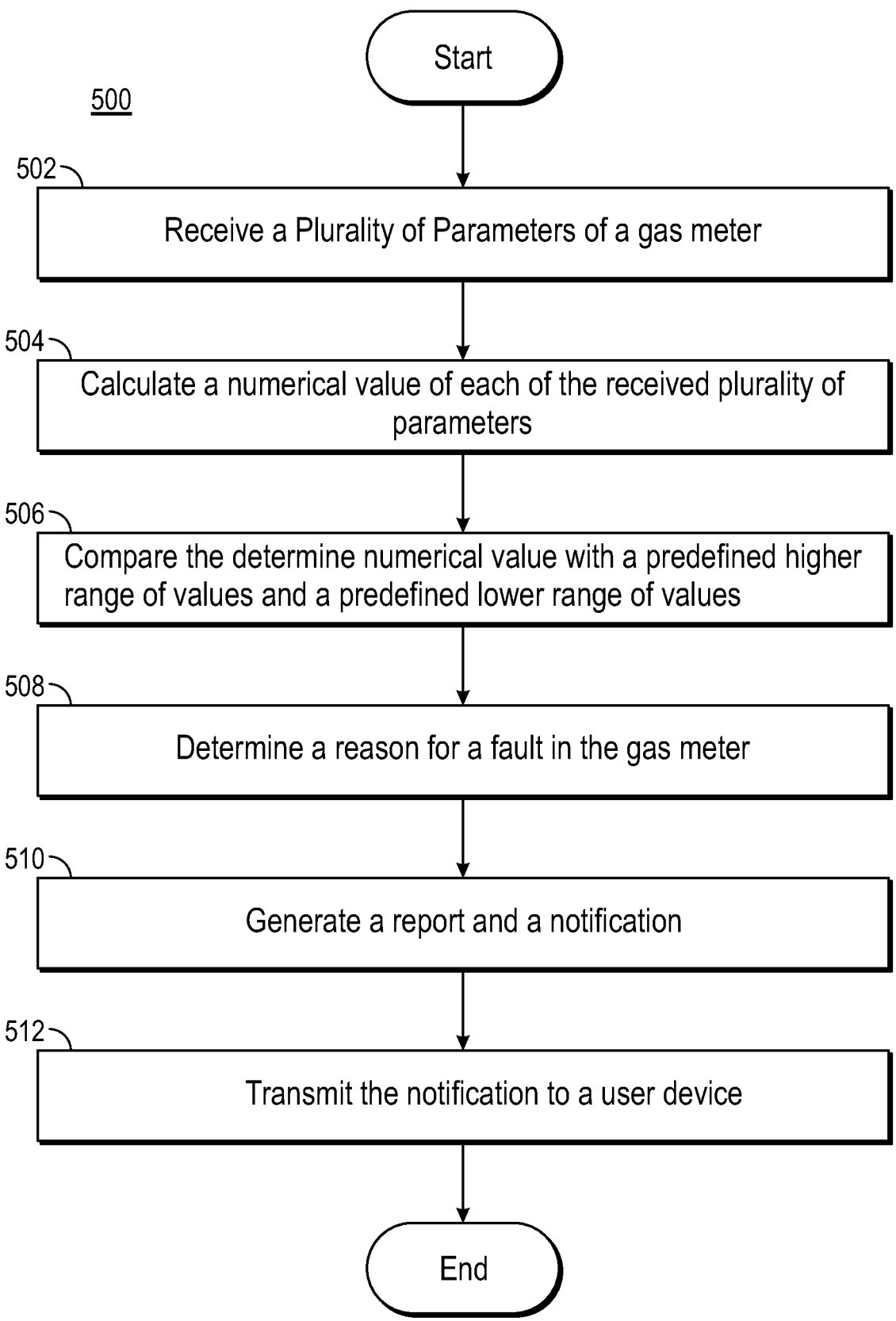
FIG. 5 is a diagram illustrating a method for an ageing and dust detection in a gas meter using the ageing and dust detection system.

FIG. 5 is a diagram illustrating a method 500 for an ageing and dust detection in the gas meter 102 within the ageing and dust detection system 100.

At step 502, the ageing and dust detection system 100 may receive data of the parameters associated with the gas meter 102. The parameters may be, but not limited to, the temperature inside the gas meter 102, the time of the gas meter 102 in the field, the accumulated volume of the flow, the amplitude of the signal, the shape of the signal, the resonance frequency, the capacity of the filter mat 124, the resistance of the filter mat 124, and so forth.

At step 504, the ageing and dust detection system 100 may calculate the numerical value of the parameters based on the received data, as discussed above.

Next, at step 506, the ageing and dust detection system 100 may compare the calculated numerical value of the parameters with a corresponding predefined higher range of values for each of the parameters, and a corresponding predefined lower range of values for each of the parameters.

At step 508, the ageing and dust detection system 100 may determine the reason for the fault in the measurement of the gas meter 102 based on the compared numerical values.

Further, at step 510, the ageing and dust detection system 100 may generate a report comprising the reason for the fault in the measurement of the gas meter 102 and the calculated numerical values of the parameters. The ageing and dust detection system 100 may further generate a notification that may comprise the report and an alert signal.

At step 512, the ageing and dust detection system 100 may transmit the generated notification to the user device 108 of the user and to the head-end system for alerting the user such as, but not limited to, a meter operator.

Any publication or patent document that may be noted herein is hereby incorporated by reference to the same extent as if each individual publication, or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A dust detection system, comprising:
a data collection unit connected to a gas meter and configured to collect a set of parameters of the gas meter;
a memory device storing executable instructions; and
a processing unit in communication with the memory device and connected to the data collection unit that is configured to:
receive data associated with at least one parameter in the set of parameters of the gas meter, wherein the at least one parameter includes a resonance frequency;
calculate a numerical value of the resonance frequency;
compare the calculated numerical value of the resonance frequency with a standard resonance frequency to determine a shift;
in response to determining a shift in the calculated resonance frequency from the standard resonance frequency, determine a fault in the gas meter due to a presence of dust; and
generate at least one of an alert or a report based on the fault.

2. The system of claim 1, wherein the set of parameters of the gas meter further includes at least one of, a temperature inside the gas meter, a time of the gas meter in a field, an accumulated volume of a flow, an amplitude of a signal, a gain amplification from an automatic-gain-control, a shape of the signal, a capacity of a filter mat of a multifunctional dust trap, a resistance of the filter mat of the multifunctional dust trap.

3. The system of claim 1, wherein the processing unit is configured to calculate the resonance frequency based on the received data representing a wave package received at a second transducer from a first transducer of a flow tube of the dust detection system by using a Fast Fourier Transform (FFT).

4. The system of claim 3, wherein the first transducer and the second transducer are connected in the flow tube of the gas meter such that the first transducer and the second transducer face each other.

5. The system of claim 3, wherein the processing unit is configured to generate a graph of the FFT for the wave package upstream received at the second transducer from the first transducer to calculate the resonance frequency and an amplitude drop.

6. The system of claim 3, wherein the processing unit is configured to generate a graph of the FFT for the wave package upstream received at the second transducer with the presence of the dust to calculate the resonance frequency.

7. The system of claim 1, wherein the gas meter comprises a display connected to the processing unit which is configured to display the generated report.

8. The system of claim 1, wherein the processing unit comprises an input module configured to receive the data associated with the parameters of the gas meter, a data processing module configured to process the data received from the input module, a report generation module configured to generate the report based on the processed data from the data processing module, an output module configured to display the generated report, and a notification module configured to transmit a generated notification to a user device.

9. A dust detection system, comprising:
a data collection unit connected to a gas meter, configured to collect a set of parameters of the gas meter, wherein the set of parameters of the gas meter are at least one of, a temperature inside the gas meter, a time of the gas meter in a field, a volume of a flow, an amplitude of a signal, a gain amplification from an automatic-gain-control, a shape of the signal, a resonance frequency, a capacity of a filter mat of a multifunctional dust trap, a resistance of the filter mat of the multifunctional dust trap;
a memory device storing executable instructions; and
a processing unit, in communication with the memory device and connected to the data collection unit, and an upper conductive grid and a lower conductive grid that is configured to:
  receive data associated with at least one parameter in the set of parameters of the gas meter, wherein the at least one parameter includes the resonance frequency;
  calculate a numerical value of the resonance frequency;
  compare the calculated numerical value of the resonance frequency with a standard resonance frequency to determine a shift;
  in response to determining a shift in the calculated resonance frequency from the standard resonance frequency, determine fault in the gas meter due to a presence of dust; and
  generate at least one of an alert or a report based on the fault.

10. The system of claim 9, wherein the processing unit is configured to calculate the resonance frequency based on the received data representing a wave package received at a second transducer from a first transducer of a flow tube of the dust detection system by using a Fast Fourier Transform (FFT).

11. The system of claim 10, wherein the first transducer and the second transducer are connected in the flow tube of the gas meter such that the first transducer and the second transducer face each other.

12. The system of claim 10, wherein the processing unit is configured to generate a graph of a FFT for the wave package upstream received at the second transducer from the first transducer to calculate the resonance frequency and an amplitude drop.

13. The system of claim 10, wherein the processing unit is configured to generate a graph of a FFT for the wave package upstream received at the second transducer with the presence of the dust to calculate the resonance frequency.

14. The system of claim 10, wherein the processing unit comprises an input module configured to receive the data associated with the parameters of the gas meter, a data processing module configured to process the data received from the input module, a report generation module configured to generate the report based on the processed data from the data processing module, an output module configured to display the generated report, and a notification module configured to transmit a generated notification to a user device.

15. A method comprising steps of:
receiving data associated with a set of parameters of a gas meter from a data collection unit connected to the gas meter, and a plurality of conductive grids of a multifunctional dust trap, wherein the set of parameters of the gas meter are selected from one of, a temperature inside the gas meter, a time of the gas meter in a field, an accumulated volume of a flow, an amplitude of a signal, a shape of the signal, a gain amplification from an automatic-gain-control, a capacity of a filter mat of a multifunctional dust trap, a resistance of the filter mat of the multifunctional dust trap, a resonance frequency;
calculating a numerical value of at least one parameter in the set of parameters based on the received data wherein the at least one parameter is resonance frequency;
comparing the calculated numerical value of the resonance frequency with a standard resonance frequency to determine a shift;
in response to determining a shift in the calculated resonance frequency from the standard resonance frequency, determining a fault in the gas meter due to the presence of dust; and
generating at least one of an alert or a report based on the fault.

16. The method of claim 15, further comprising:
displaying the generated report on the display connected to the gas meter.

* * * * *